(No Model.)
J. Y. SMITH.
ENSILAGE CUTTER.
No. 258,258.  Patented May 23, 1882.
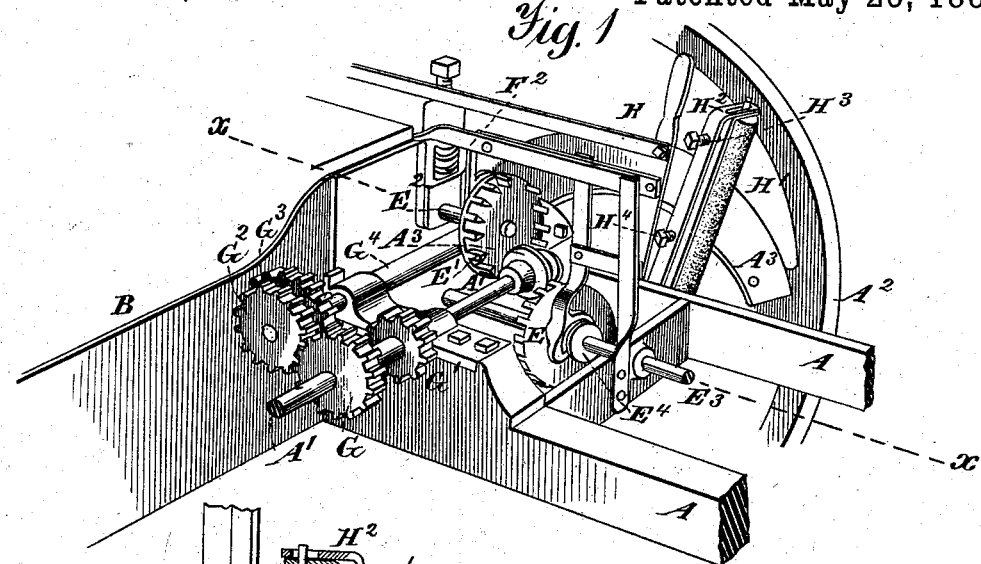
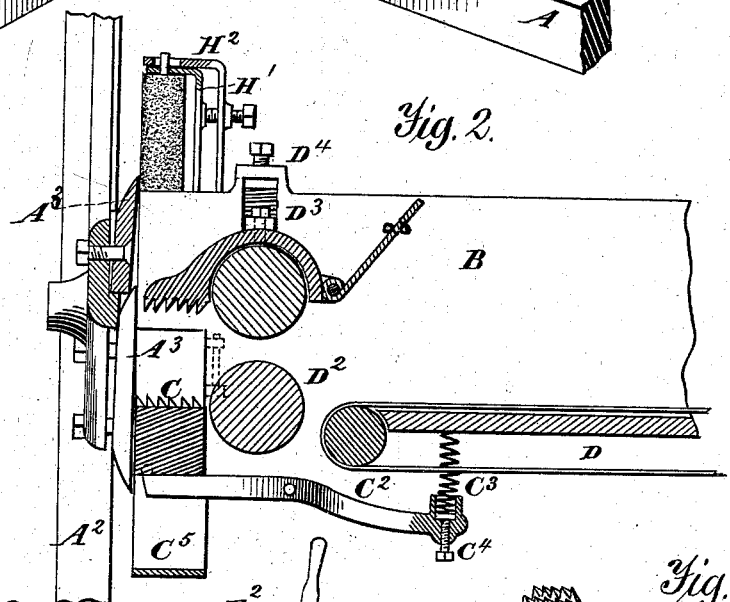
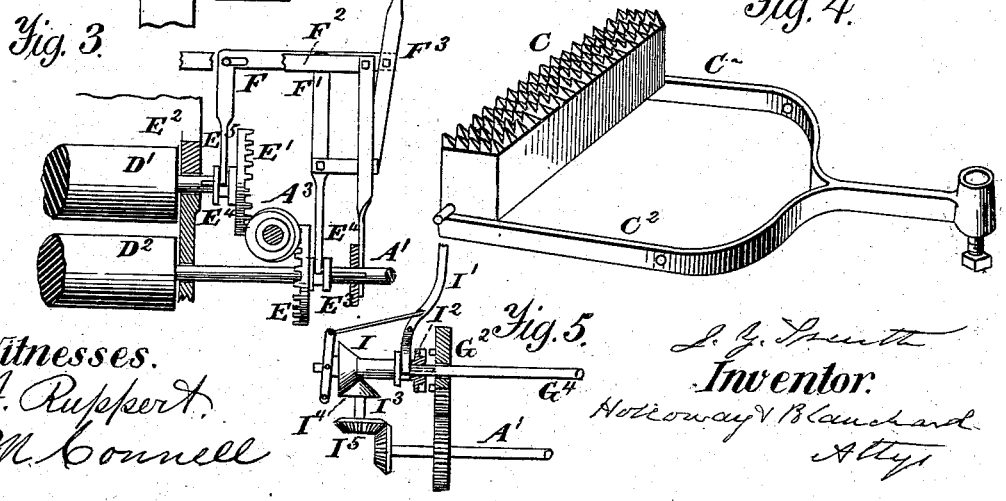
Witnesses.
A. Ruppert
C. M. Connell
Inventor.
J. Y. Smith
Holloway & Blanchard
Attys

UNITED STATES PATENT OFFICE.

JOHN Y. SMITH, OF PITTSBURG, PENNSYLVANIA.

ENSILAGE-CUTTER.

SPECIFICATION forming part of Letters Patent No. 258,258, dated May 23, 1882.

Application filed September 14, 1881. (No model.)

*To all whom it may concern:*

Be it known that I, JOHN Y. SMITH, a citizen of the United States, residing at Pittsburg, in the county of Allegheny and State of Pennsylvania, have invented certain new and useful Improvements in Ensilage-Cutters; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to machines for cutting hay, grasses, straw, cornstalks, and other similar substances to be at once used as food for animals, or to be packed in silos in the form of ensilage; and the objects of my improvements are, first, to provide a yielding cutting-bar for such machines; second, to provide a novel feed-motion therefor; and, third, to provide a knife-sharpener which shall be operated by the movement of the knives. I attain these objects by the mechanism illustrated in the accompanying drawings, in which—

Figure 1 is a perspective view of a portion of a machine for cutting food for animals, showing the feed mechanism, a portion of the cutting-box, the balance-wheel, one of the knives for cutting the material, a knife-sharpener, the frame upon which the operating parts rest, and the mechanism for throwing the feed-rollers into and out of gear. Fig. 2 is a longitudinal section of a portion of the machine, showing a portion of the cutter-box, the yielding cutter-bar, adapted to facilitate the passage of stones or other foreign substances, with the devices for holding it in position, the feed-rollers, the feeding-apron, the balance-wheel, the cutting-knife, and a knife-sharpener. Fig. 3 is a transverse section on line $x\ x$ of Fig. 1, the worm and worm-wheels being shown in elevation; and Fig. 4 is a perspective view, showing the yielding cutting-bar and the yoke for supporting it, Fig. 5 showing devices for reversing the movements of the feed-rollers.

Similar letters refer to similar parts in the several views.

In constructing machines of this kind there is provided any suitable frame-work, A, to which to attach the operating parts.

The main shaft of the machine is placed in boxes attached to the frame, and carries the balance-wheel $A^2$, to which the knives $A^3$ are attached, pulleys for driving it, and gear-wheels for driving the feed-rollers. The direction in which the shaft rotates is such as to cause a downward cut of the knives as the material is fed to them through the cutter-box B, which is so arranged as to guide it directly thereto, it being provided with a vertically-moving cap attached to the bearings which carry the upper feed-roll, which has attached to it an adjustable yielding plate, as shown in Fig. 2, the office of which is to direct the material downward from the upper part of the box and cause it to pass directly to the space between the rollers.

The knives $A^3$ may be of the curved form shown in Fig. 1, and have a continuous cutting-edge; or they may consist of a plate of metal having sectional cutting-edges attached to it, as described in an application for Letters Patent filed by me of even date herewith. In either case the knives are secured to the arms of the balance-wheel, or to a wheel provided especially for carrying them, and placed upon the driving-shaft in such a position as to cause them to pass down in contact, or nearly in contact, with the outer edge of the cutter-bar C, as shown in Fig. 2.

The cutter-bar just alluded to consists of a yielding bar of metal, the office of which is to allow any stones or other hard substances that may pass between the feed-rollers with the material to be cut to pass down with it, being caused to do so by its coming in contact with the knives, the effect being to prevent the breaking of said knives, or of the other parts of the machine, such result being accomplished on account of the fact that the feed-rollers are some distance in rear of the cutter-bar, as a consequence of which the material, being relieved from pressure at the point where it rests upon the bar, is readily opened out by the action of the knives upon coming in contact with the hard substance, which will readily pass down with the bar and be removed out of the path of the knife. This bar is carried upon a lever, $C^2$, which is pivoted to the frame of the machine or to the cutter-box, its outer end being provided with a spring, $C^3$, and with a set-screw, $C^4$, by which the exact position of the cutter-bar can be adjusted, the arrangement of said cutter-bar and its supporting-lever being substantially such as is shown in Fig. 2, in order that in the event of any hard substance being deposited upon said bar it will be carried downward, and thus allow such substance to fall off, such downward movement being caused by the action of the knives in coming in contact with said substance. For the purpose of arresting the downward movement of the bar at the proper point a stop, $C^5$, is provided, against which the lower edge of the lever $C^2$ comes in contact when the bar has been depressed far enough to allow the stone or other substance to fall from it, after which the operator or the spring $C^3$ will return the bar to its normal position. The upper surface of this cutter-bar is provided with a series of projections, as shown in Fig. 4, the object of which is to cause them, acting in conjunction with similar ones formed upon the under surface of the cap which covers the upper roll, to prevent the rolling of the material into balls or rolls at that point, as it is liable to do when the projections are not used.

Should it be found desirable, a door—such as is shown in Fig. 2—may be inserted in or attached to one side of the feed-box, so as to open outward and allow stones or other obstructions to pass out thereat, the substance being carried to that point by the action of the knives.

For the purpose of carrying the material to be cut to the cutting-point there is provided an endless apron, D, of strong cloth, leather, or other suitable material, which is made to pass over rollers in the usual way, it being moved by the passing material as it is drawn forward by the rolls, or by a belt or gear-wheels driven from the main shaft of the machine.

Feed-rollers $D'$ and $D^2$ are provided, which take the material from the apron and pass it forward to the knives. These rolls are located in the cutter-box and in the rear of the cutter-bar, the lower one, by preference, being fixed in its position, while the upper one is allowed to rise and fall vertically, its upward movement being caused by the material in passing between it and the lower one, and its downward movement by springs $D^3$, the tension of which is regulated by a set-screw, $D^4$. The feed-rolls are driven by the worm $A^3$, which is placed upon the shaft $A'$, said worm being caused to mesh into gear-wheels E E', the teeth of which are upon their sides, they being mounted upon the shafts of the feed-rolls $D'$ and $D^2$, one of which, as shown, is above the other.

The form of gearing shown is essential in a machine organized as this is, on account of the fact that the upper roller is caused to change its position vertically in operating the machine, and hence the wheel E' must, of necessity, be permitted to move up and down without being disengaged from the worm which drives it. The arrangement of parts shown in Fig. 3 enables this action to occur, as the wheel is allowed to pass up and down for some distance without being disengaged from the worm.

For the purpose of enabling the operator to arrest the movements of the feed-rolls, when it is desirable to do so, there is placed upon the outer surface of the gear-wheels E and E' hubs $E^3$ and $E^4$, which have an annular groove formed in them into which enters the bifurcated ends of shifters F F', they being attached to a frame, $F^2$, and provided with slots, so that they may be moved thereon by means of a handle, $F^3$, the arrangement of the parts being such that by one movement of the handle both of the wheels E and E' are moved, one being thrown out of gear and the other into gear with the worm $A^3$, said wheels being allowed to slide on their respective shafts, but prevented from turning thereon by a feather placed therein which passes through a spline formed in the wheel.

Upon the outer end of the worm-shaft of the machine there are placed two gear-wheels of different diameters, they being designated by the letters G and G', which mesh into other wheels, $G^2$ and $G^3$, mounted upon the main or driving shaft $G^4$, which has its bearings in the frame of the machine. The gear-wheels here alluded to are of varying sizes, so that by sliding the ones G and G' on their shaft they will be caused to mesh with a larger or smaller one on the driving-shaft, and thus give to the feed-rolls a greater or less speed, as desired, the effect being to cause the material to be fed to the knives in such a manner as to be cut into longer or shorter pieces.

For the purpose of making provision for reversing the movements of the feed-rolls there is attached to the outer end of the driving-shaft $G^4$ a conical wheel, I, to which there is attached a hub-sleeve, in which is formed a groove for the reception of a shifter, I', inside of which there is placed a clutch, $I^2$, of any suitable form, it being so arranged as to engage with projections formed upon the gear-wheel $G^2$ on the driving-shaft, which gives motion to the clutch and the beveled or conical wheel I.

For the purpose of communicating the motion of the last-named wheel to a counter-shaft, $I^3$, it is made to bear, when desired, upon a similar wheel, $I^4$, placed on the shaft $I^3$, upon the opposite end of which there is placed a beveled-gear wheel, $I^5$, which meshes into and drives a similar wheel secured to the outer end of shaft $A'$.

The arrangement of the above-named parts is such that when the machine is in operation, the clutch at such times being out of contact with the wheel $G^2$, the wheel I will remain in a state of rest; but should it become desirable to reverse the movements of the rollers, all that is required is to move the lever I' into such a position as to cause the clutch to engage the projections upon the wheel $G^2$, when the result will be accomplished. It is not my intention, however, to confine myself to any particular form of wheels used in reversing the movements of the rolls, as various forms may be adopted which will produce the same result without departing from my improvement.

In machines of this type, and in others designed for cutting food for animals, it is important that some provision should be made for sharpening the knives without removing them from their places upon the driving-wheel. For the accomplishment of this object there is provided a sharpener, H, which may consist of a roller or otherwise-formed piece of wood covered with emery or other substance, which, as the knives come in contact with it, will have the effect to grind or sharpen them; or it may consist of a finely-fluted piece of steel properly hardened, the effect of which will be similar to that of emery placed upon wood. Whatever this sharpener may be made of, it is to be placed in a frame or yoke, H', in which there are formed bearings therefor. This yoke is arranged in a frame, H², which is provided with screws H³ H⁴ for adjusting it and the sharpener, so that as the knives pass it they shall come in contact with said sharpener and thus be ground or sharpened. By making the sharpener round and placing it in the position shown, or in any other that will cause the knives to partially rotate it in passing, the desired result will be accomplished.

Having thus described my invention, what I claim, and desire to secure by Letters Patent, is—

1. A cutter-bar for use in machines for cutting food for animals, having upon its surface a series of projections for preventing the rolling of the material, in combination with the cutting-knives, substantially as set forth, and for the purpose specified.

2. The combination of the curved cutting-knives A³ and the grinding-roller H, mounted in an adjustable frame, the arrangement of the roller with reference to said curved knives being substantially such as is described and shown, whereby the action of the knives in passing it is made to cause a rotation or partial rotation thereof, thus causing it to sharpen the knives, substantially as set forth.

3. In a machine for cutting food for animals, and in combination with the cutting-knives, the cutter-bar C, having a series of projections upon its upper surface, and the vertically-moving cap covering the upper feed-roll, a portion of the under surface of which is provided with a series of projections, substantially as shown and described.

4. In combination with the cutting-box of a machine for cutting food for animals, a movable cap for covering the adjustable feed-roll, and an adjustable plate for directing the material to be cut to the feed-rollers.

In testimony whereof I affix my signature in presence of two witnesses.

JOHN Y. SMITH.

Witnesses:
W. H. SMITH,
J. F. MEYERS.